Sept. 21, 1965  A. J. KAYE  3,206,857
INSPECTION APPARATUS
Filed Dec. 26, 1961  7 Sheets-Sheet 2

INVENTOR.
ANTHONY J. KAYE
BY
ATTORNEY

Sept. 21, 1965  A. J. KAYE  3,206,857
INSPECTION APPARATUS
Filed Dec. 26, 1961  7 Sheets-Sheet 4

INVENTOR.
ANTHONY J. KAYE
BY
ATTORNEY

Sept. 21, 1965

A. J. KAYE 3,206,857

INSPECTION APPARATUS

Filed Dec. 26, 1961

INVENTOR.
ANTHONY J. KAYE

BY

*Merton D. Moore*

ATTORNEY

Sept. 21, 1965  A. J. KAYE  3,206,857
INSPECTION APPARATUS
Filed Dec. 26, 1961  7 Sheets-Sheet 6

FIG. 15

INVENTOR.
ANTHONY J. KAYE
BY
ATTORNEY

Sept. 21, 1965  A. J. KAYE  3,206,857
INSPECTION APPARATUS
Filed Dec. 26, 1961  7 Sheets-Sheet 7

FIG. 16

INVENTOR.
ANTHONY J. KAYE
BY
ATTORNEY

United States Patent Office 3,206,857
Patented Sept. 21, 1965

3,206,857
INSPECTION APPARATUS
Anthony J. Kaye, Schenectady, N.Y., assignor to General
Electric Company, a corporation of New York
Filed Dec. 26, 1961, Ser. No. 162,170
9 Claims. (Cl. 33—174)

My invention relates to inspection apparatus, and more particularly to such apparatus adapted to inspect work pieces into which apertures have been worked, or bored, to determine the accuracy of location of such apertures.

In present day manufacturing many shop machines are program controlled by automatic equipment controlled by punched cards, punched tape, magnetic tape, and the like. One such machine is illustrated in U.S. Patent No. 2,848,670 to Kelling. These machines operate to effect different operations on a work piece, such as the boring of holes of desired sizes, one after another, at desired predetermined locations in the work piece all in accord with a program set up on the punched cards, punched tapes, or magnetic tapes, which are fed into the machine.

Frequently after a work piece has been prepared, and holes bored therein at desired locations in accord with a prepared specification, or drawing, of the work piece, it is desired to inspect the piece for accuracy of the locations of such holes, or apertures. It is often also desired to check the flatness or parallelism or other surface conditions of the work piece. An object of my invention is to provide inspection equipment for these purposes.

Inaccuracies in the locations of the holes may be due either to an error in programming on the tapes or punched cards or to inaccuracies in operation of the machine. These machines are designed to operate with accuracies of .0001 inch or less and errors are ordinarily in thousandths or ten thousandths of an inch and seldom are as great as a thirty-secondth of an inch, although, at times, gross errors do occur.

In accord with my invention, a machine is employed to effect such inspection, the machine being of the type of the ordinary jig bore machine having a planar work table movable along orthogonal coordinates, and a rotatable spindle centrally of the table, usually above, rotatable about an axis extending at right angles to and through the table much in the fashion of the ordinary chuck holder, chuck, and cutting tool of the ordinary jig bore machine. The relative position of the planar table and said spindle axis, as well as movement of the spindle along the axis, toward and away from the table, may be controlled by numerical control equipment as jig bore machines are controlled today.

One difficulty involved in the use of a numerically controlled equipment for the inspection purposes here referred to arises from the fact that such equipment itself involves inaccuracies of the order of those involved in the operation of the machine used in preparing the piece the accuracy of which is to be determined. That is, such machines involves moving parts such as the planar table movable on two coordinates which are driven by servo mechanisms which involve inaccuracies of the same magnitude as the allowable tolerances in the desired manufacture of the part.

An object of my invention is to provide means, and a method of inspection, whereby such mechanism may be usefully employed in inspection of various surface conditions of parts so prepared and whereby position determinations of apertures in pieces manufactured may be made with accuracy far greater than the accuracy of which numerical controlled mechanism as now commonly produced are capable.

Another object of my invention is to provide means to eliminate the inaccuracies in the numerical controlled mechanism in the use of such mechanism for inspection purposes.

Another object of my invention is to determine surface conditions and the location of apertures in work pieces by the techniques of measurement rather than those of positioning since greater accuracy is possible in the former than in the latter.

In accord with my invention the table of the numerical controlled equipment to be employed is provided with triangulation means whereby its position with respect to fixed points on the machine may be accurately ascertained at all positions in its range of movement. This triangulation means may comprise a pair of elongated vector members pivoted at a common point to the table and extending therefrom to different respective spaced apart fixed points on the machine where they are pivoted to the machine. These vector members form a triangle, the third side of the triangle being a line between the two fixed points. The lengths of all of these sides of the triangle are measurable with accuracy at all positions of the table whereby the table position with respect to the fixed points and with respect to the center of the spindle is definitely ascertainable.

A piece having holes bored therein, the accuracy of location of which is to be determined, may be placed upon the table and oriented with respect to the table in any usual way as by use of the common jig, dowl pins, etc., as is common practice. A command may then be fed to the machine appropriate to command the machine to move the table to a point such that the center of the spindle of the inspection equipment, in the absence of inaccuracies, is coincident with the point where the drawing, or other specification, of the part to be inspected, shows that the center of the hole should be. The hole chosen should be the most important one in the piece. Of course, the location of this center of the spindle is fixed with reference to the machine. Due to inaccuracies in the operation of the equipment, the point where the center of the hole in the work piece should be may not arrive at a point coincident with the center of the spindle but may arrive at a point at a distance from the spindle, the magnitude and direction of which is to be accurately determined. This may be due to errors in the boring of the hole or in the movement of the table of the inspection apparatus.

Since the position of the spindle and the position where the hole ought to be are both known, the first from the machine, itself, and the latter from the drawing or specification, and since the actual position of the table may be ascertained from the vectors, the remaining information required is the distance and direction of the actual hole as bored from the spindle. A further object of my invention is to provide means to determine this distance and direction.

To ascertain the direction and distance from the center of the actual hole to the center of the spindle, the spindle of the inspection machine, instead of being provided with a chuck holder, chuck, and cutting tool, as in the usual jig bore machine, is provided with the gaging equipment referred to. This equipment comprises three index members rotatable about the axis of the spindle. The index members may take the form of bell crank levers, pivoted at points in different radial vertical planes about the axis of the spindle, and each having an arm extending from its pivot point parallel with and normally adjacent to the axis of the spindle, and each being movable outward from the axis in the respective radial plane. Just as the cutting tool of a jig bore machine may be moved toward and away from the work in cutting a hole in the work piece, so may the spindle of the gaging equipment be moved to enter the index members into an already bored hole the position of which is to be gaged. The index members are then moved outwardly radially from the spindle axis and caused to bear resiliently against the inner walls of the hole. The spindle is then rotated. If the hole is cylindrical and on a common axis with the spindle the index members have no radial movement during this rotation. On the other hand, if the hole is cylindrical but on a different axis from the spindle axis the index members oscillate radially of the spindle as the spindle rotates.

These index members are each provided with an electrical transducer which may comprise a magnetic core and coil movable with respect to each other in accord with the movements of the respective index member thereby to vary an electromotive force in accord with the movements of the index member. The electromotive forces are supplied to suitable circuitry for effecting the desired determinations.

By arranging the index members in proper geometrical relationship, later to be described, about the axis of the spindle the indicating equipment may determine the direction of the axis of the hole from the axis of the spindle and the distance between the two axes, which may be used in determining the direction of the error and its magnitude.

In normal use of the inspection equipment, as stated before, after the machine has operated in response to a command to move the work piece having holes bored in it, to alignment of a particular hole to be gaged with the spindle, the spindle is lowered until its index members enter the first hole to be inspected. The index members are moved outward to engage the hole and the spindle is rotated. This rotation causes the transducers to produce voltages varying cyclically and in a phase relation dependent on the direction of misalignment of the axis of the hole and the axis of the spindle. A further transducer is associated with the spindle shaft producing voltage having cyclical variations corresponding to the angular positions of the shaft. These various voltages may be utilized in associated circuitry and computing equipment to determine the direction and magnitude of the distance between the two axes.

This information may then be used with other information obtained through triangulation in manners to be described hereinafter to calculate the error in the actual position of the hole.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings in which

Figures 1, 2:
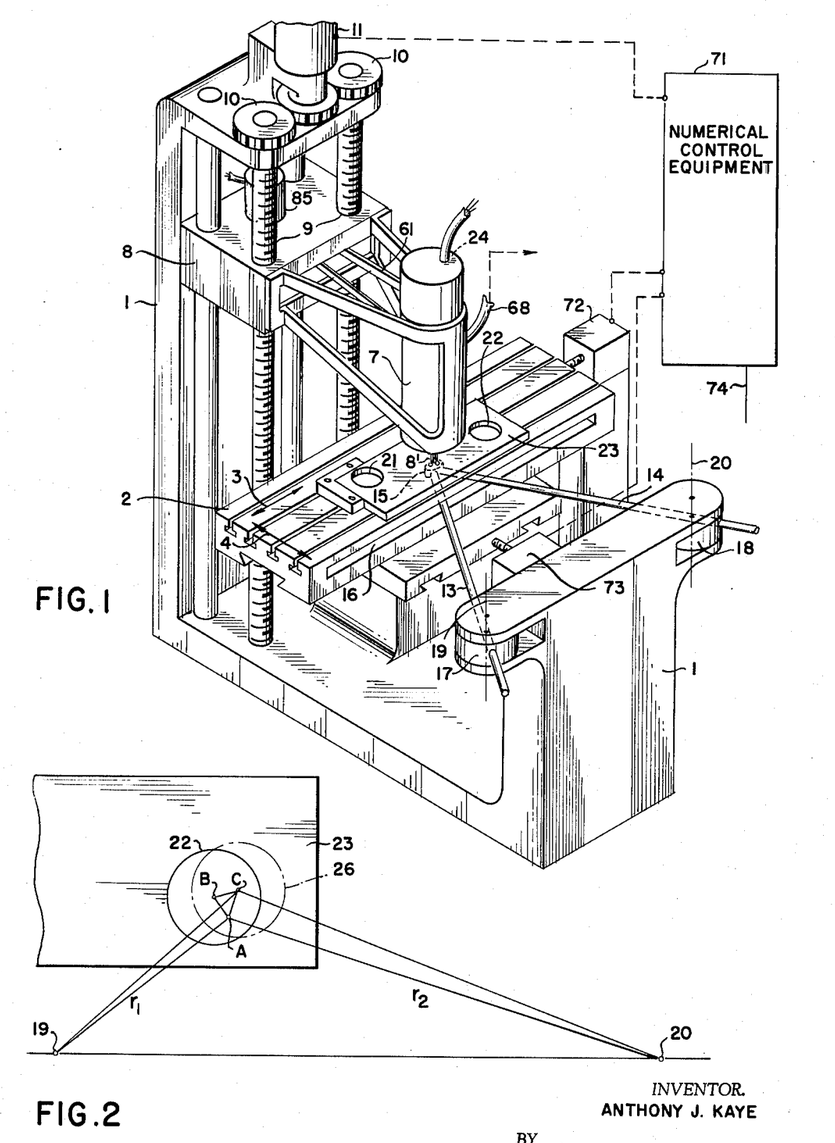
FIG. 1 is a general illustration of my invention.
FIG. 2 is a geometric figure depicting positions and quantities involved in the inspection to be effected.

Referring to FIG. 1, this figure illustrates very schematically, conventionally, and symbolically my inspection equipment as some modification of a standard jig bore machine. These machines have many well-known forms and that shown is only for illustration purposes. This inspection equipment may comprise a frame 1 carrying a planar table 2, which may be moved longitudinally of itself as indicated by the double headed arrows 3 and at right-angles thereto as indicated by the double headed arrows 4. Suitable guides, and guideways, for the table and actuating means common to such equipment are employed but are not described here because they are familiar to persons skilled in such machines.

The frame 1 also supports a spindle 7, which may be mounted on a carriage 8 and arranged for vertical movement by means of lead screws 9 driven in either direction of rotation by gears 10 and a motor 11. In this way the spindle is arranged to be raised and lowered just as the chuck holder, chuck, and cutting tool of the ordinary jig bore machine is lowered and raised during program boring of holes in a work piece under control of well-known numerical control equipment for jig bore machines.

Projecting from the bottom of the spindle 7 are three index members indicated at 8' (better illustrated at 44, 45 and 46 in FIGS. 3 to 7) which, when the spindle is lowered, may enter a hole in a work piece to be inspected, and rotated to detect error in the position of the hole as more fully explained below.

In the upper right-hand corner of the FIG. 1 is a rectangle 71 representing numerical control equipment of any now well-known kind operating in response to commands recorded on punch cards or tapes, or magnetic tapes to drive through servo systems the motors 72 and 73 which operate worm drives for table 2 to move it to any desired position on its two orthogonal coordinates. It also operates motor 11 to lower the spindle 7 after the table has been moved to the desired position in response to a recorded command fed into the machine.

The position of the planar table 2, which may carry a work piece, may be determined at any point in its movement by vector members 13 and 14. Each of these vector members 13 and 14, which comprise straight elongated rods, are pivoted to the planar table 2 at the point 15 within and below the surface of the table and they extend outwardly therefrom through elongated opening 16 in the side of the table and through bushings 17 and 18 supported in well spaced apart relation by the frame 1. These bushings 17 and 18 are arranged for rotation about vertical axes 19 and 20, respectively, through their centers so that the vector members 13 and 14 may rotate about those axes as the planar table is moved along either of its coordinates. During such movement the vector members slide through the bushings to positions corresponding to the various positions of the table. These vector members comprise measuring means from which the position of the table may be accurately determined.

Thus, these vector members comprise two sides of a triangle, the third side being a line extending between the two vertical axes 19 and 20. Since the length of these two vectors 13 and 14 and the length of the line 19, 20 between the two vertical axes may all be measured at all positions of the planar table, the position of the table at all times may be definitely determined with respect to these vertical axes.

FIG. 1 shows a work piece 23 mounted in fixed position on the table and having holes 21 and 22 therein into which the index members may be lowered, after proper orientation of the table, to determine the position of the center of the hole from the center of the spindle. This may be effected after the position of the table has been accurately ascertained by means of the vector triangles 13, 14, 19, 20.

FIG. 2 may be taken to represent the work piece 23 having the hole 22 bored therein, after the work table has been moved by the orientation control equipment to bring the position at which the hole should be under the spindle. For example, the point C may be taken to be the proper position of the center of the hole, shown in dotted lines, as indicated by the drawing or other specification of the work piece. The numerical command is supplied to the numerical control equipment directing it to move the point C to a desired predetermined position relative to point A which is the center of the spindle. Actually, due to inaccuracies in the operation of the equipment the point C may not arrive at the desired location and point B becomes the actual center of the drilled hole. The problem is to determine the position of point B with respect to point C.

The points 19 and 20 represent the vertical axes through the bushings 18 and 19. Of course, if the length of arms $r_1$ and $r_2$ are accurately determined, the position of point A can definitely be fixed with respect to the points 19 and 20. The measurement of $r_1$ and $r_2$, which is schematically shown by vector arms 13 and 14, may be done with desired accuracy by known means. If desired, optical means may be used, as may also such devices as the equipment sold by General Electric Company under the name "Accupin," described in an article by J. M. Rhoades in the American Machinist/Metalworking Manufacturing magazine, September 18, 1961, pages 106–107.

Similarly, from the drawing or specification of the machined part, the point C is known and the triangle C, 19, 20 is known. This information is recorded on the punched cards or tapes which contain this numerical control equipment. From the known quantities outlined above, the length of line AC can be calculated using simple triangulation methods.

The only remaining information to be ascertained by measurement is the length and direction of the line AB between the center of the spindle and the center of the hole as actually bored. This is effected by use of the spindle in connection with an angle encoder 24 connected to the rotating shaft of the encoder and which, as will later be described, produces an output in digital code indicating the position in rotation of the spindle at any time.

After the length and direction of line AB has been determined, the length and direction of line BC can be calculated using simple triangulation. As explained above, the line BC is the actual deviation of the center of the hole.

Figure 3:
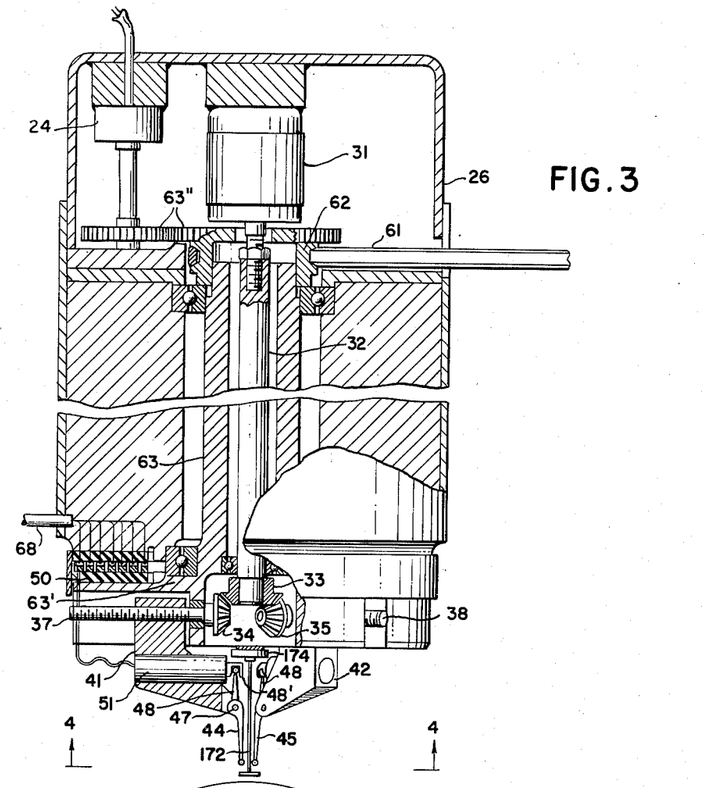
FIG. 3 is a sectional view of the spindle employed in my invention showing the index members.

FIG. 3 shows the spindle as comprising a housing 26 having mounted within it a motor 31 arranged to drive the vertical shaft 32 of the spindle, which carries at its lower end a bevel gear 33. This bevel gear 33 engages three additional bevel gears two of which, 34 and 35, are shown in FIG. 3. Each of these bevel gears drives a screw-threaded rod one of which, 37, is shown in FIG. 3, and another of which is partially indicated at 38 in FIG. 3. The rods extend radially from the spindle axis at desired angles from each other.

Each of these screw-threaded rods carries a rider, two of which, 41 and 42, are shown in FIG. 3. These riders are shaped to carry at their lower extremities three bell crank levers, 44, 45 and 46, respectively, only bell crank levers 44 and 45 being shown in FIG. 3, all three being shown in FIG. 4. These bell crank levers 44, 45 and 46 are pivoted at respective points 47 to the members 41, 42 and 43, as shown, and have integral therewith upwardly extending arms 48 each of which engage end 48' of a magnetic core member 53 of a respective electromagnetic transducer 51 carried in a bore in the respective rider 41, 42, 43. The cores extend radially of the axis of the spindle and are actuated axially of themselves by the bell crank levers. The lower extremities of these bell crank levers comprise the index members which engage the wall of a hole to be gaged.

Figure 4:
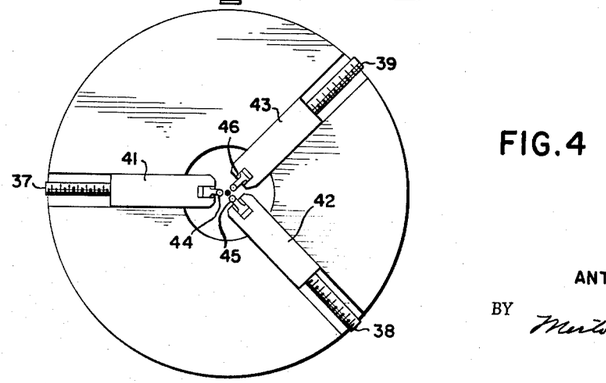
FIG. 4 is a plan view of the spindle looking upward at the bottom of the spindle shown in FIG. 4.

FIG. 4 is a view looking upward at the bottom of the equipment shown in FIG. 3 and shows the bottoms of the riders 41, 42 and 43 in a suitable angular relationship to each other, each having the threaded rods 37, 38 and 39 extending therefrom, and each carrying a respective bell crank lever, or index member 44, 45 and 46.

Figures 5, 5A, 6:
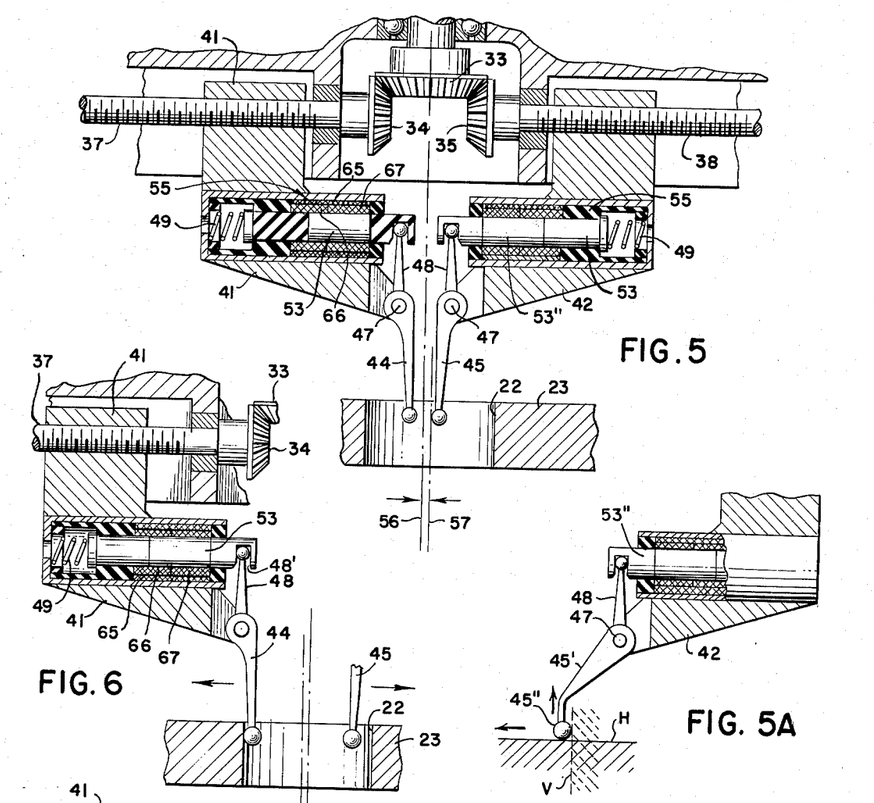
FIG. 5 is an enlarged view of a portion of the equipment of FIG. 3 better showing the transducers controlled by the index members.
FIG. 5A is a modification of the index members shown in FIG. 5.
FIG. 6 shows the index members operated to a position where one of them engages the wall of an aperture to be gaged.
Figure 7:
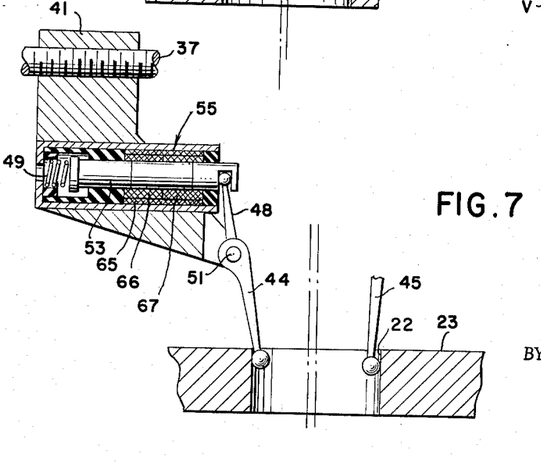
FIG. 7 shows the index members during rotation about the wall of the aperture being gaged.

This structure is better illustrated in FIG. 5 which is an enlarged sectional view of the spindle head, or lower portion of the equipment of FIG. 3, but showing only the riders 41 and 42. For simplicity, only riders 41 and 42 are shown and, for illustration purposes, they are shown as in the same plane although an angular relationship such as that shown in FIG. 4 is contemplated.

The index members 44 and 45 are pivoted at points 47 to the respective riders 41 and 42 and each is provided with an upwardly extending arm 48, the upward extremity of which may be attached, or fitted, in any suitable way, to a core member 53 of electromagnetic material, which is actuated axially of itself by movement of the members 48. These core members each extend axially of one or more electromagnetic windings 55 of a transducer, the impedance of which is varied in accordance with the position of the core and hence in accordance with the position of the index member.

These transducers may comprise any suitable type of device capable of producing an electromotive force, or impedance, varying preferably linearly, in response to and in accordance with the radial movements of the members 48. The article "A Critical Evaluation of High-Precision Electromechanical Linear Measuring Systems," which appears at pages 128 to 140 of the publication "Electrical Manufacturing" for August 1957, shows a number of transducers of types adaptable to this application.

Electrical connections to the winding of the transducers may be brought out through the slip ring and brush structure generally indicated at 50 in FIG. 3.

FIG. 5 also shows a work piece which may be the work piece 23 of FIG. 2 having a hole 25 bored therein. The spindle head of FIG. 5 is shown in the position which it may occupy with respect to the work piece after it has been lowered into an aperture 25 in the work piece.

FIG. 5A shows a modification of the index members which enable them also to be used in a manner to be described hereinafter to check the flatness or parallelism of horizontal or vertical surfaces. In FIG. 5A, a "dog leg" type of index member 45' is shown in which the sensing tip 45" is in a vertical plane offset from that of pivot 47 in order that tip 45" may move arcuately upward when brought to bear against either a vertical surface V or a horizontal surface H. This arcuate motion of sensing tip 45" in response to a horizontally or vertically applied force is translated by the resulting movement of the upper end 48 of the index member 45' into a corresponding horizontal motion of core 53" against the force of spring 49.

In FIG. 5 the vertical line 56 represents the axis of the spindle and the line 57 represents the center of the hole 25 in the work piece which is assumed to be cylindrical. The axes are shown non-coincident to indicate an inaccuracy in the location of the hole 25.

It may be desired to determine the direction and the magnitude of this inaccuracy. The numerical control equipment is commanded to bring the hole into alignment with the spindle and to lower the spindle to gage the hole. The spindle motor 31 of FIG. 3 is then operated to drive the riders 41, 42 and 43 outward to a position such as that illustrated in FIG. 6, in which one of the index members 44 engages the wall of the aperture to be gaged and enough farther so that with a transducer, as described in connection with FIG. 14, a null occurs in the output of the respecive transducers. This brings all of the index members 44, 45 and 46 into yielding engagement with the wall of the aperture, actuating cores 53 outward against springs 49 and placing those springs under compression. This condition of the index members is shown, with some exaggeration, in FIG. 7.

Thereafter the numerical control equipment is commanded to rotate the spindle, as by driving the belt 61 shown in FIGS. 1 and 3. This belt is driven by motor 85 of FIG. 1 and extends about the pulley 62 which is connected with a hollow shaft 63 of the spindle and through which the shaft 32 extends from the motor 31 to the spindle head. As shown in FIG. 3, all of the riders 41, 42 and 43 and their screw-threaded rods 37, 38 and 39, are carried by bearings mounted upon a bracket 63' carried by shaft 63. All of the index members are now rotated about the aperture and in resilient engagement with the aperture wall. If the aperture is all center with the axes of the spindle, as illustrated in FIG. 5, the index members rotate about their pivot points 47 actuating the cores 53 in their respective transducers axially of themselves, and in such relationship to each other that electromotive forces may be produced across the windings of these transducers having variations from which the direction and magnitude of the error in the position of the aperture may be determined. The rotation of shaft 63 also produces a corresponding rotation of the shaft of angle encoder 24 by means of a gear train 63" attached to the upper end of shaft 63.

Figure 8:
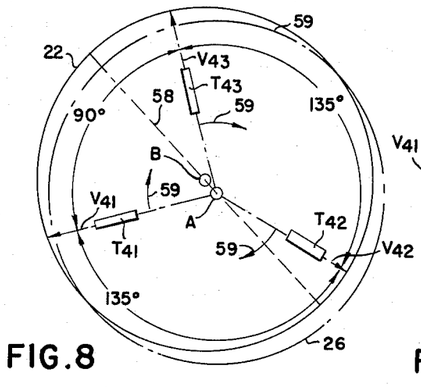
FIGS. 8, 9 and 10 represent schematically the index members at various selected positions in their rotation.
Figure 9:
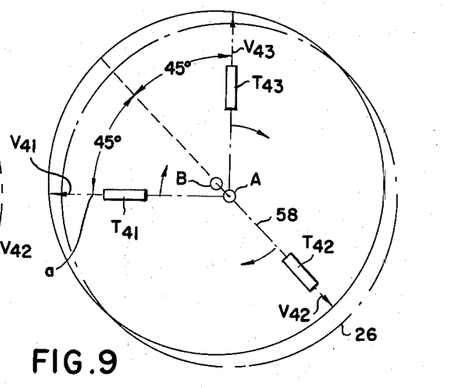
Figure 10:
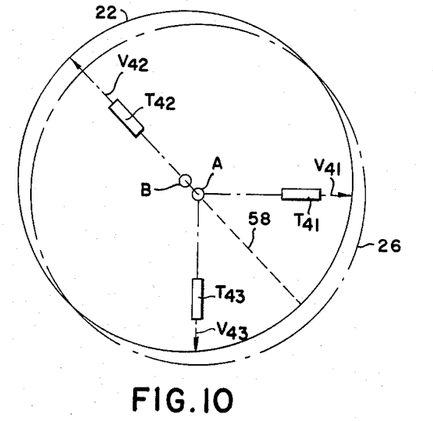

This operation may be better explained by reference to FIGS. 8 to 13. In FIGS. 8, 9 and 10 the full line circle 22 represents the actual position of a hole 22 in the work piece. The center of the hole 22 is at point B. The dotted circle 26 represents the position which the hole should occupy in the work piece. The center of circle 26 is coaxial with the axis A of the spindle.

The straight dash line 58 through the two centers B and A represents the direction of the error, and the distance between these centers represents the magnitude of the error. Both of these quantities are to be determined.

The length of the vectors $V_{41}$, $V_{42}$ and $V_{43}$ extending from the axis 56 of the spindle to the wall of the actual hole, in the plane of the respective index members 41, 42 and 43, represents the distance between the spindle axis and the wall at the instantaneous point of engagement of the respective index member with the wall.

The rectangles $T_{41}$, $T_{42}$ and $T_{43}$ represent the transducers controlled by the respective index members and the voltage across which may increase, or decrease, as desired, dependent on the construction of the transducer employed, as the core is moved radially to the spindle.

For example, in FIG. 8 the spindle is assumed to be rotating in the direction of the arrow 59. All of the vectors are at unequal angles to line 58, and are of unequal length. The vector $V_{41}$ is approaching line 58 and is getting longer. The vector $V_{43}$ is receding from line 58 and is getting shorter. Vector $V_{42}$ is approaching the opposite end of line 58 and getting shorter.

Figure 11:
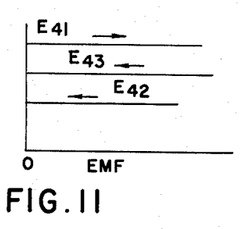
FIGS. 11, 12 and 13 represent conventionally typical relationships between electromotive forces appearing at the transducers when the index members are in the positions illustrated in FIGS. 8, 9 and 10, respectively.

The electromotive forces on the transducers, corresponding to this condition, may be represented by the length of the horizontal lines $E_{41}$, $E_{42}$ and $E_{43}$ in FIG. 11 and by the arrows thereon showing the instant direction of change in voltage. Thus, FIG. 11 represents that voltage from transducer $T_{41}$, as represented by line $E_{41}$, is getting larger as indicated by the arrow; that voltage on transducer $T_{43}$, as represented by line $E_{43}$, is larger than voltage $E_{41}$ but getting smaller, and that voltage on transducer $T_{42}$, as represented by line $E_{42}$, is smaller than either of the others and is getting smaller.

FIG. 9 represents the same vectors advanced in rotation to the position where vectors $V_{41}$ and $V_{43}$ are at equal angles to line 58 each being 45° therefrom. They are of equal length. The length of vector $V_{41}$ is increasing and that of vector $V_{43}$ is decreasing, both at their maximum rates. At the same time, vector $V_{42}$ is coincident with line 58, has its minimum length and is changing at its minimum rate, which at the instant illustrated is zero. These maxima and minima result from the angular relationship between the vectors, or index members, the vectors $V_{41}$ and $V_{43}$ being 90° apart and each being 135° from vector $V_{42}$. This is the angular displacement of riders 41, 42 and 43.

Figure 12:
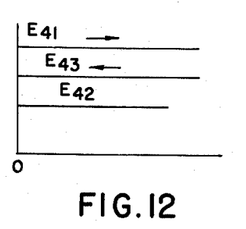

The corresponding condition of the voltages on the transducers is represented in FIG. 12 in which the horizontal line $E_{41}$ and $E_{43}$ have equal lengths representing equal voltages from the transducers $T_{41}$ and $T_{43}$ and bear arrows showing change in voltage in opposite directions. The horizontal line $E_{42}$ has its shortest length, which is less than the two equal voltages, and, for the instant represented, is not changing.

The angular position of the spindle in its rotation, when the condition illustrated in FIG. 12 occurs, i.e., when voltage $E_{41}$ and $E_{43}$ are equal and $E_{42}$ minimum, corresponds to the direction of the error. The voltage $E_{42}$ represents the minimum distance between the center of the spindle and the wall of the hole.

FIG. 10 represents the condition in which all of the vectors have advanced 180° from the position represented in FIG. 9 and where the vectors $V_{41}$ and $V_{43}$ are at equal angles from the opposite end of line 58 and vector $V_{42}$ is coincident with line 58.

The vectors $V_{41}$ and $V_{43}$ are again of equal length, but of shorter length than illustrated in FIG. 9. Vector $V_{41}$ is decreasing, and $V_{43}$ increasing, in length. Vector $V_{42}$ has its maximum length and is of greater length than either $V_{41}$ or $V_{43}$ and, at the instant illustrated, is not changing in length.

Figure 13:
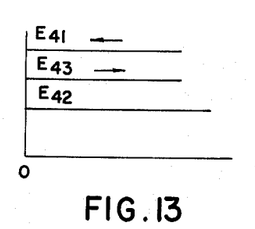

The condition of the voltages on the transducers of FIG. 10 is represented in FIG. 13 where the voltages $E_{41}$ and $E_{43}$ are shown to be equal and smaller than $E_{42}$. This condition again corresponds to the direction of the error in the position of the hole 25.

The direction of the error, i.e., the angle between line 58 and a desired reference, which may be line 19, 20 of FIG. 1, may be ascertained from the digital output of the angle encoder 24 in FIG. 1 on the vertical shaft of the spindle whenever the voltage conditions are as represented in FIGS. 9 and 10, i.e., when the voltages from transducers $T_{41}$ and $T_{43}$ are equal and that from transducer $T_{42}$ is maximum or minimum.

The magnitude of the error is ascertained from the maximum and minimum values of voltage $E_{42}$. That is, the voltage $E_{42}$ in FIG. 13 represents the maximum distance between the center of the spindle and the wall of the hole. Voltage $E_{42}$ in FIG. 12 represents the minimum distance between the center of the spindle and the wall of the hole. Thus, half of the difference in these two quantities represent the true error, that is—

$$\frac{E_{42}\ (FIG.\ 13) - E_{42}\ (FIG.\ 12)}{2} = Error$$

The voltages $E_{41}$, $E_{42}$ and $E_{43}$ derived from the transducers and the output from the digital angle encoder 24 may be supplied to suitable computing apparatus to indicate both the direction and the magnitude of the error in the position of the hole 22.

It should be observed that in both of the situations represented by FIGS. 9 and 10, where the vectors $V_{41}$ and $V_{43}$ are of equal length and at equal displacements from the direction of the error to be determined, any change in angular position of these vectors produces maximum rate of change in voltage from the respective transducers. This is important because it improves accuracy of the angular determination just as the point in the angular position of the spindle where the angle determination is to be made.

It should also be noticed that at this same angular position, the rate of change in voltage produced on transducer $T_{42}$, due to movement of the vector $V_{42}$, is minimum. In fact, at the exact instant illustrated the change is zero.

Figure 14:
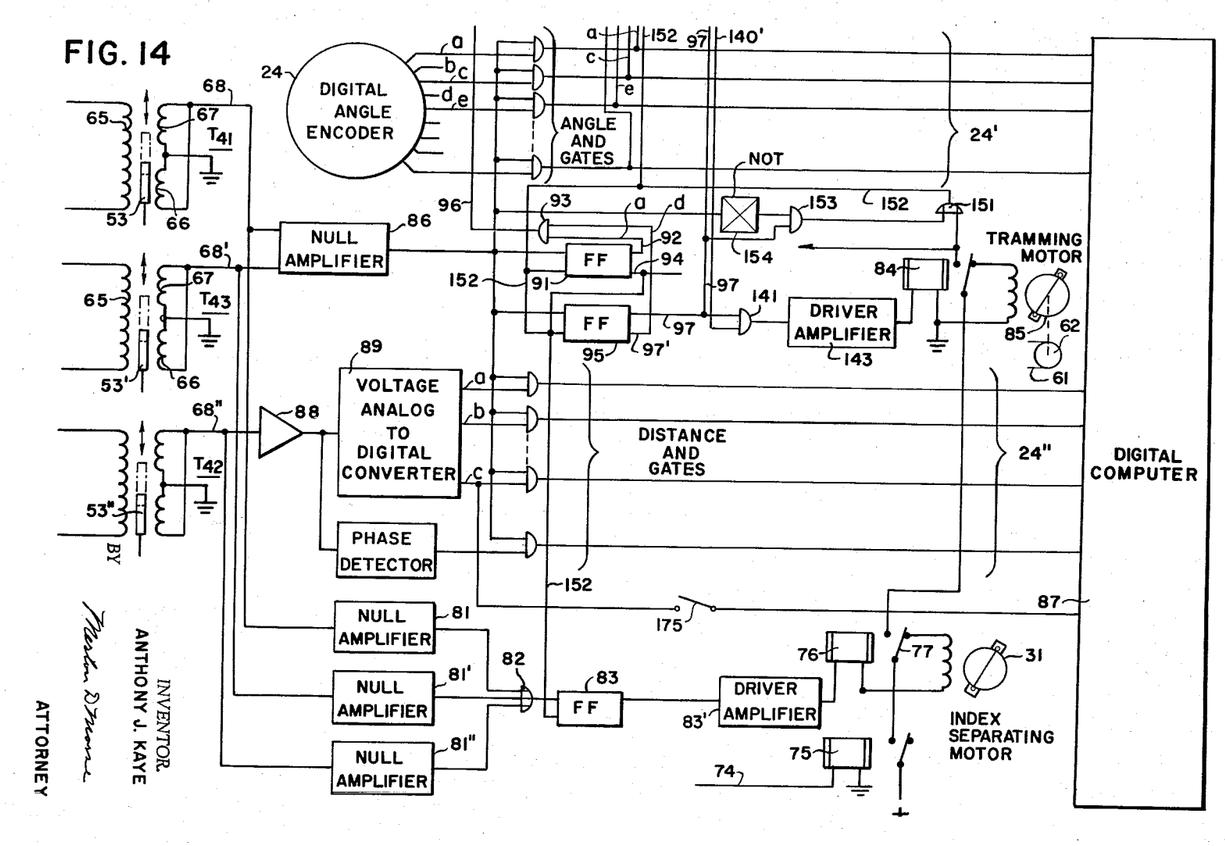
FIGS. 14 and 15 represent a circuit which may be used in connection with my invention.
Figure 15:
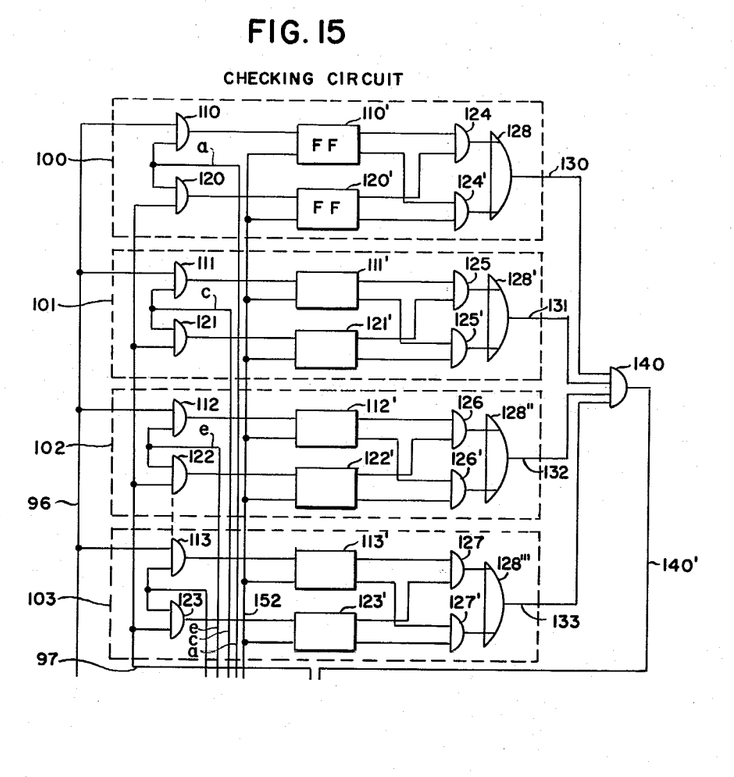

FIGS. 14 and 15 represent one logic circuit useful in connection with the mechanical equipment already described.

The diagram of FIGS. 14 and 15 illustrates the logic of the system in which the circuit structure of the logic elements, represented by symbols on the drawing, may take many forms. As one illustration of circuit structures that may be employed in the logic elements it is stated here that the terms "OR" gate, "AND" gate, "NOT" and "flip flop," as used herein, may refer to circuits designated by those terms on page 398 of Van Nostrand's Scientific Encyclopedia, Third Edition, 1958, by Van Nostrand Co., in Princeton, New Jersey. Of course other circuit structures may be employed to perform the logic functions referred to herein by those terms.

At the left-hand side of FIG. 14 are shown schematically the three transducers $T_{41}$, $T_{42}$, and $T_{43}$ having respective core members 53, 53'' and 53', each of which is adapted to be moved vertically from a normal full line position, as shown in FIG. 14, to a dotted line position within a transformer structure comprising a primary winding 65 and two secondary windings 66 and 67.

These windings 65, 66 and 67 may physically be arranged as shown in FIG. 5. With the index members at their normal inward position the core 53 extends from one end of the winding 67 through winding 67 partially into winding 66. Upon movement of the index member against the wall of a hole to be engaged the core is pushed to the left as shown in FIG. 5 and may, at a point in its movement, lie equally within the two secondary windings 66 and 67. These two windings have their adjacent terminals grounded, as shown in FIG. 14, and are wound oppositely so that, when the core is equally within the two secondary windings, equal and opposite voltages appear at their outer extremities which are connected together. Thus, a null appears on conductors 68, 68' and 68''. Normally, voltage appears at all of these points.

When the numerical control equipment represented by the rectangle 71 in FIG. 1, which controls the motors 72 and 73 which drive the table, and the motor 11, which raises and lowers the spindle 24, has moved the table to a position where a hole to be gaged is under the spindle, and the spindle is lowered to bring the index members within the hole, a signal is supplied from the numerical equipment over conductor 74 to relay 75 in FIG. 14 causing that relay to be energized to energize the motor 31 for separating the index members. This circuit is completed through the back contacts of a relay 76.

The index fingers now start to move apart and continue to move until one of the transducers $T_{41}$, $T_{42}$, or $T_{43}$ produces a null on its respective conductor 68, 68' or 68''. When this occurs the respective null amplifier 81, 81', 81'' produces an output. That is, so long as there is any input voltage supplied to the input of the null amplifier no output appears therefrom but when any one of the transducers produces a null the corresponding null amplifier 81, 81', 81'' produces an output voltage, which is supplied through an OR gate 82 to a flip flop 83 which in turn supplies voltage through a driver amplifier 83' to relay 76 causing that relay to be energized and to move its armature 77 to the left thereby stopping the index separating motor and energizing, through the back contact of relay 84, the tramming motor 85. This motor 85 is shown on FIG. 1. It drives the belt 61 which rotates the spindle.

This null occurs after the first index member has reached the wall of the hole being gaged and moved enough further to produce the null. This is sufficient movement to bring all of index members against the wall of the hole and to compress all of springs 49, FIG. 5. Thus, rotation of the spindle begins upon occurrence of the first null in any one of the transducers.

Thereafter, when the first position is reached, such as that illustrated in FIG. 9, in which a null is produced simultaneously by both of transducers $T_{41}$ and $T_{43}$ then null amplifier 86 produces an output. This output is supplied to one input terminal of each of a group of AND gates, which are designated on the drawing as "ANGLE AND GATES." It is also supplied to one terminal of each of a further group of AND gates which are designated on the drawing "DISTANCE AND GATES."

Each of these AND gates have two input terminals. The remaining input terminal of the ANGLE AND gates are connected to respective output conductors $a, b, c, d, \ldots$ etc., of the digital angle encoder 24 and the outputs of these ANGLE AND gates are connected to the computer 87. The digital angle encoder 24 produces potentials on its output conductors $a, b, c, d, \ldots$ etc., representing, in digital code, the numerical sine, or other function, of the angle between vector 42 of FIG. 9 and a fixed reference direction. Thus, at all times when the two transducers $T_{41}$ and $T_{43}$ simultaneously produce nulls, the angle at which the vector 42 lies with respect to a fixed reference is supplied in digital code to the computer 87.

At the same time the voltage output from transducer $T_{42}$ is supplied through an amplifier 88 to a voltage-analog-to-digital converter 89. This converter also has several outputs, $a, b, c, \ldots$ etc., each of which is connected to one input terminal of one of the AND gates of the DISTANCE AND gates. The voltage on the output conductors $a, b, c, \ldots$ etc., of the converter 89 are in digital code varying with the amplitude of the voltage at the output of transducer $T_{42}$. These voltages are supplied through these AND gates to the computer in digital code representing the distance between the spindle axes A and the wall of the hole at the instant when the null occurs.

At the same time the output from the null amplifier 86 is supplied to flip flop 91 causing an output to appear on its output terminal 92, which terminal is connected to one of the inputs of an AND gate 93. Previous to this switching a voltage was present at terminals 94 and 97'. The terminal 94 is connected to the reset side of flip flop 95 and prevents this flip flop from changing state during the time the first pulse from the null amplifier is present. After flip flop 91 has changed state the output on terminal 94 disappears, thus allowing flip flop 95 to change state if and when the second pulse from the null amplifier 86 arrives. Thus, after the first pulse from the null amplifier has arrived at flip flop 91, outputs are present on terminals 92 of this flip flop and 97' of flip flop 95. These outputs are supplied to the respective input terminals of AND gate 93 causing an output to appear on conductor 96 where it is supplied to a plurality of comparator circuits 100, 101, 102, 103 (FIG. 15) in a checking circuit to be described.

Each of these comparators has two input AND gates, 110, 120; 111, 121; 112, 122; 113, 123; etc. One of these comparator circuits is provided for each of the output conductors $a, b, c, \ldots$ etc., of encoder 24, each of which is connected to one terminal of each of the respective pair of input AND gates.

The opposite terminal of input AND gates 110 to 113 are connected to conductor 96 and therefore these AND gates are enabled by an output on that conductor to transmit potential from the respective encoder output conductor $a, b, c, \ldots$ etc., to the respective flip flops 110' to 113' thereby causing these flip flops to assume conditions corresponding to the potential on the respective output conductor $a, b, c, \ldots$ etc., this condition representing the angle of the transducer at the instant of the null. This condition remains in the checking circuit to be compared with the condition when the spindle has rotated another 180°.

The tramming motor continues to operate, driving the spindle through 180° when a second null should appear simultaneously on transducers $T_{41}$ and $T_{43}$. This may represent the condition in FIG. 10. When this occurs the null amplifier 86 again has an output which, since flip flop 91 is already on, is not affected, but it turns on flip flop 95 producing an output on conductor 97. This conductor is connected to one input of each of input AND gates 120, 121, 122, 123 of each of the comparator circuits of FIG. 15, the opposite input of which is also connected to the same output of the digital angle encoder that the other AND gate of the same comparator circuit is connected to. Thus, these outputs are supplied to flip flops 120′, 121′, 122′, 123′.

Since the sine, or other function, of any angle is numerically equal to the corresponding function of the same angle plus 180° (except for sign), the numerical quantity supplied from the digital angle encoder through the ANGLE AND gates to the comparators during these two successive null conditions should be the same, with the result that the two flip flops of all of comparators 100, 101, 102, 103 are in the same condition. This follows from the fact that both flip flops of any comparator respond to the potential on the same output conductor of the digital angle encoder.

The outputs of these flip flops in each comparator are so connected through their output AND gates 124 to 127′ and OR gates 128 to 128′″ that when both flip flops in each comparator are in the same condition a like potential appears on the output conductors 130, 131, 132 and 133 of the different comparators. These outputs 130 to 133 are all connected to respective inputs of an AND gate 140 which produces an output which enables AND gate 141 in FIG. 14 to transmit the potential from the output 97 of flip flop 95 to the driver amplifier 143 which operates to energize relay 84. This relay attracts its armature deenergizing the tramming motor 85. Thus, the spindle stops rotating since the second null has been reached.

Thus, the angle at which the second null occurs is again supplied to the computer 87 from the digital angle encoder 24 through conductors 24′. Similarly, the magnitude of the voltage produced by transducer $T_{42}$ is converted to digital code and is supplied to the computer through conductors 24″.

Thus, during each of the two successive nulls, the instant angle of the spindle is supplied in digital code through conductors 24′ to the computer 87. Simultaneously, the magnitude of the voltage of the output of transducer $T_{42}$ is also supplied in digital code through conductors 24″ to the computer. This computer may be a general purpose digital device such as General Electric 225 of which a number are on the market and which includes storage devices whereby the quantities supplied to it during the first null are stored until the second null occurs when the desired calculation is made.

One of these calculations is, of course, to subtract the lesser of the two voltages from transducer $T_{42}$ from the larger and to divide the remainder by 2. This computais is one of a number of computations which are necessary to determine the actual error in the position of the hole, viz., the direction and length of line BC of FIG. 2. Since the direction and length of lines AC and AB are now known, line BC may be calculated.

When relay 84 attracts its armature to stop tramming motor 85 that armature engages a front contact thereby supplying an output through OR gate 151 and conductor 152 to reset all of the flip flops in FIGS. 14 and 15.

Should a malfunction of the apparatus occur, then the two flip flops in all of the comparators 100 to 103, etc., will not be in the same condition with the result that no check signal appears at the AND gate 140 and on conductor 140′ with the result that AND gate 141 is not enabled to supply the output from conductor 97 to the driver amplifier 143 and relay 84 does not become energized. Thus, the tramming motor continues to operate. The output voltage from null amplifier 86 disappears as soon as the simultaneous nulls at the inputs disappear and, consequently, an output appears at the output of NOT circuit 154. This output is supplied through AND gate 153 and OR gate 151 to conductor 152, which is connected to the reset terminals of all the flip flops in FIGS. 14 and 15. Thus, the flip flops are reset in readiness for another operation.

The tramming motor 85 continues to operate until two simultaneous nulls occur 180° apart or the equipment is shut down. Of course, any desired form of signal apparatus may be employed to indicate the malfunction.

It may occur in the use of the apparatus that due to an improper command or malfunction of the apparatus that the spindle may be lowered onto the work piece at a point such that it misses the hole to be gaged altogether. The result may be injury to the index members 44, 45, 46. FIG. 3 shows means to prevent such injury. This means comprises a feeler probe 172 which consists of a small rod projecting downward from the spindle along the axis of the spindle and between the index members 44, 45, 46 when in their normal position. It also projects beyond the ends of the index members to be first to engage the work piece on the lowering of the spindle. Should it so engage the work piece it will be moved upward to open a switch 174 carried by the spindle, which may be utilized to de-energize the circuit of the motor 11, thereby to stop the lowering of the spindle before damage occurs.

In order to obtain an indication of the flatness or parallelism of horizontal or vertical surfaces when a dog-leg type index member 45′ such as illustrated in FIG. 5A is used, one output C of the voltage-analog-to-digital converter 89 is connected directly to the digital computer 87 through a switch 175. The index member 45′ which operates upon transducer $T_{42}$ is brought into contact with a horizontal or vertical surface of the work piece to be inspected and the work piece is then moved slightly further in order to cause core 53″ to move towards its null position. With switch 175 closed, the digital computer 87 reads the output of the analog-to-digital converter 89 and thus indicates when the null condition is reached. The work piece is thereafter moved horizontally or vertically, as appropriate, to cause the sensing tip 45″ to traverse the surface being inspected. Any deviations in flatness of the surface being inspected will cause core 53″ of transducer $T_{42}$ to move away from this null position and provide a corresponding deviation in the output of the analog-to-digital converter 89 recorded by the digital computer 87. The extent of these deviations may be calibrated to provide a measurement of the actual flatness of the surfaces being traversed.

It will be appreciated that, in the apparatus of FIG. 1, table 2 supporting the work piece may be moved horizontally under spindle 7 in order to provide this surface inspection. During such motion, the vector members 13 and 14 slide within their respective bushings 17, 18 to move with table 2 and, as described hereinbefore, comprise triangulation measuring means for accurately determining the loci of table positions during the course of such movement. The vectors 13 and 14 can thus be used to insure that the movement of the work piece is along a uniform horizontal plane in order that any deviations of core 52″ from null position, as recorded by computer 87, may be solely attributable to deviations in the actual surface being inspected and not the result of deviations in the planar movement of the work piece itself. If vertical surface inspection is desired, the planar table 2 and the vector members 13, 14 may, in accord with well-known constructions, be supported for vertical movement with respect to spindle 7 rather than horizontally, as shown.

Figure 16:
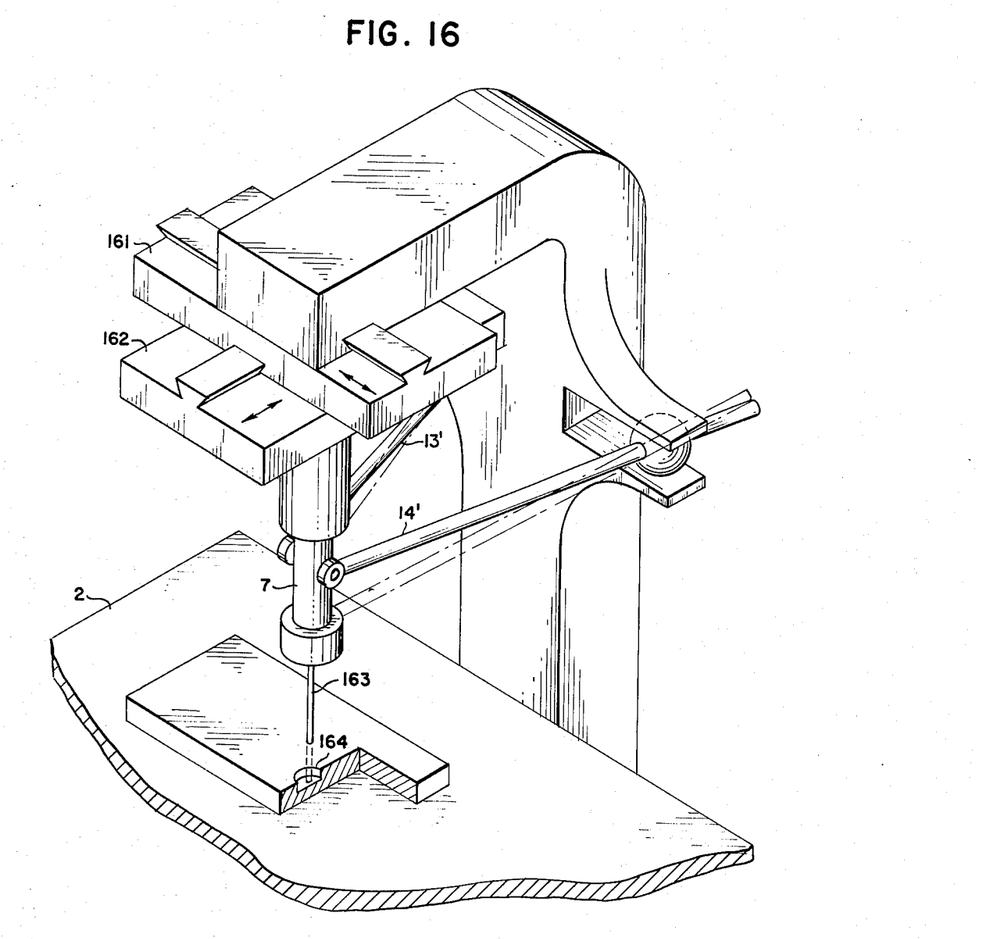
FIG. 16 represents a modification.

FIG. 16 shows a modification of the equipment in which the work piece 2 may be fixed in position whereas the spindle 7 may be movable on orthogonal coordinates by means of members 161, the latter of which carries the spindle. These members 161, 162 may be driven by the numerical control equipment in suitable guides just as the table 2, shown in FIG. 1, is driven.

Spindle 7 is also provided with triangulation means 13′ and 14′ which are arranged to determine the position of the spindle with respect to the apparatus in the horizontal plane just as has been described with references to FIG. 1. However, in FIG. 16 triangulation may be effected in the vertical plane as the spindle is moved upward and downward by measurement of the members 13′ and 14′ when the spindle is in a desired position.

The spindle 7 is shown as carrying a probe 163 which, when in its lower position, may engage the bottom of a hole 164 in the work piece thereby to measure the depth of the hole, the depth being determined by triangulation.

While I have shown a particular embodiment of my invention, it will, of course, be understood that I do not wish to be limited thereto since various modifications, both in the circuit arrangement and in the instrumentalities employed, may be made and I contemplate by the appended claims to cover any such modifications as fall within the true spirit and scope of my invention.

What I claim as new and desire to secure by Letters Patent of the United States is:

1. In combination, a work table adapted to support a work piece, a spindle above said table, said table and spindle being movable relative to each other, triangulation measuring means including a pair of vector members pivoted to said table accurately to gage the relative position of said spindle and table over a range of their relative movement, at least one index member carried by and movable relative to said spindle for yielding contact with a surface of a work piece to be inspected, and means for deriving a voltage responsive to the extent of movement of said index member relative to said spindle when said index member moves in contact with said surface.

2. In an apparatus for gaging the accuracy of the position B of the center of a hole as actually bored in a work piece relative to the desired position C of said center as determined from specifications therefor, the combination of a work table to carry said piece movable on orthogonal coordinates, a spindle at one side thereof movable along an axis A at right angles to the plane of said table, a pair of vector members both pivoted to said table and to fixed respective points spaced apart along said table, numerical control apparatus responsive to a command specifying point C to move said table according to said command to bring point C coincident with said axis A whereby after said movement of said table the actual position of the point C relative to the axis A may be determined from the position of said vector members and dimensions provided by said specification, means carried by the spindle to gage the alignment of the actual hole with said axis and to determine the direction and extent of any non-alignment of the center of the hole as bored with said axis, whereby the position B of the center of the hole relative to the position specified therefor may be determined from the directions and lengths of lines AB and BC.

3. The combination, in a work piece inspection equipment, of a planar work table member adapted to support a work piece having an aperture the position of which is to be gaged, a spindle above said table rotatable about an axis at right angles to the plane of said table, said table and spindle member being movable relative to each other along orthogonal coordinates, means accurately to gage the relative positions of said spindle and table throughout the range of their relative movement, whereby the position of a work piece fixed on said table may be ascertained relative to said spindle, a plurality of index members carried by said spindle, all movable along said first axis into an aperture to be gaged and movable radially of the axis of the spindle to engage the walls of said aperture at different radial positions from said spindle axis while said spindle is rotated, an electrical transducer associated with each of said index members and providing an electrical signal responsive to the position thereof, and means to determine the position of said aperture relative to the spindle axis from the movements of said index members during such rotation.

4. The combination, in equipment to determine accurately the location of holes bored in a work piece, of a work table adapted to carry said work piece movable along orthogonal coordinates, a spindle movable along an axis at right angles to the plane of said coordinates and rotatable about said axis, said spindle carrying a plurality of index members movable in different radial planes from the axis of said spindle and adapted to engage the wall of said hole in said work piece when said spindle is positioned along said axis to gage the location of said hole, means to spread said index members to engage said wall and to rotate said spindle, including an electrical transducer associated with each of said index members and providing an electrical signal responsive to the position thereof, and means to determine the direction and distance between the center of said hole and the axis of the spindle from the relative movements of said index members during said rotation.

5. The combination, in a work piece inspection equipment, of a planar work table member adapted to support a work piece having one or more apertures to be checked as to position, a rotatable spindle member at one side of said table member rotatable about an axis extending at right angles to and through said table member, one of said members being movable relative to the other along orthogonal coordinates at right angles to said axis, triangulation means including vector members, each pivoted at a respective fixed point and at a common point on said one movable member, said fixed points being spaced apart, whereby the position of said table may be determined relative to said first pivot points throughout a desired range of movement by triangulation, said spindle having an index member movable along said axis into an aperture in a work piece on said table member, means to bear said index against the inner wall of said aperture, means to rotate said member about said axis while said member bears against said wall, and means responsive to the movements of said index member due to engagement with said wall during rotation by said last means.

6. The combination, in a work piece inspection equipment, of a planar work table member adapted to support a work piece having one or more apertures to be checked as to position, a rotatable spindle member at one side of said table member rotatable about an axis extending at right angles to and through said table member, one of said members being movable relative to the other along orthogonal coordinates at right angles to said axis, triangulation means including two vector members, each pivoted at a respective fixed point and at a common point on said one movable member, said fixed points being spaced apart, whereby the position of said table relative to said first pivot points throughout a desired range of movement may be determined by triangulation, said spindle having pivoted thereto a plurality of index members each lying along said axis and movable outward therefrom in different radial planes, said spindle being movable along said axis to a position where said index members enter an aperture to be located and when actuated outward engage the wall of said aperture, means to rotate said spindle whereby said index members when actuated outward may be oscillated by the wall of said aperture, and means responsive to the relative movements of said index members to determine the direction of the center of the aperture from said axis.

7. The combination, in a work piece inspection equipment, of a planar work table member adapted to support a work piece having one or more circular apertures to be checked as to position, a rotatable spindle member at one side of said table member rotatable about an axis extending at right angles to and through said table member, one of said members being movable relative to the other along orthogonal coordinates at right angles to said axis, triangulation means including vectors members, each pivoted at a respective fixed point and at a common point on said one movable member, said fixed points being spaced apart, whereby the position of said table relative to said first pivot points throughout a desired range of movement may be determined by triangulation, said spindle having pivoted thereto three index members each lying along said axis and movable outward therefrom about their respective pivots in different radial planes, two of said planes being at an angle to each other substantially smaller than the angles between them and the third plane the latter two angles being equal to said spindle being movable along said axis to enter said index member in said circular aperture to be located, whereby said index members when actuated outward engage the wall of said aperture and are oscillated thereby when said spindle is rotated if said axis does not agree in position with the center of the axis, and means controlled by the relative movements of said index members to determine the direction and distance of said center from said axis.

8. The combination, in a work piece inspection equipment, of a work table arranged for movement in two directions, and adapted to carry a work piece having apertures therein the relative positions of which in said work piece are to be measured, a pair of vector arms each pivoted to said work table at a common point and to said machine at a fixed point individual to the respective vectors said individual points being spaced apart, a rotatable spindle supported at one side of said table, and having a plurality of index members rotatable in unison about a common axis at right angles to the plane of said table, and means to move said spindle to a position where said index members are within one of said apertures, whereby the position of the work piece may be determined by measurements between said pivot points, and the position of any aperture may be determined from the position of said index members when against the walls of said apertures at different respective angles from the axis of rotation of said spindle.

9. In combination, a planar work table adapted to support a work piece, a spindle above said table rotatable about a vertical axis, said table and spindle being movable relative to each other, triangulation measuring means including a pair of vector members pivoted to said table and extending radially from their pivot points accurately to measure the relative positions of said spindle and table over a range of their relative movement, at least one index member carried by and movable relative to said spindle for yielding contact with a surface of a work piece to be inspected, and means for deriving a voltage responsive to the extent of movement of said index member relative to said spindle to measure a condition of said surface when said index member moves in contact with said surface during relative movement between said spindle and work table.

References Cited by the Examiner

UNITED STATES PATENTS

| | | | |
|---|---|---|---|
| 1,823,719 | 9/31 | Baker | 33—147 |
| 2,355,316 | 8/44 | Mestas | 33—178 |
| 2,400,293 | 5/46 | Dunn | 33—172 |
| 2,483,743 | 10/49 | Turrettini | 33—172 |
| 2,621,416 | 12/52 | Brenneke | 33—178 |
| 2,723,461 | 11/55 | Reason | 33—172 |
| 2,734,277 | 2/56 | Dixon | 33—172 |
| 2,739,389 | 3/56 | Carter | 33—174 |
| 2,831,258 | 4/58 | Eisele | 33—172 |
| 2,832,023 | 4/58 | Gough | 77—63 |
| 2,860,419 | 11/58 | Muller | 33—172 |
| 2,924,018 | 2/60 | Mahlmeister | 33—147 |
| 2,956,342 | 10/60 | Eisele | 33—174 |
| 3,028,675 | 4/62 | Mahlmeister et al. | 33—172 |
| 3,056,208 | 10/62 | Murtland | 33—147 |
| 3,073,034 | 1/63 | Antoszewski | 33—174 |

ROBERT B. HULL, *Primary Examiner.*

ISSAC LISANN, *Examiner.*